US009851581B2

(12) United States Patent
Kurashige

(10) Patent No.: US 9,851,581 B2
(45) Date of Patent: Dec. 26, 2017

(54) OPTICAL SCANNING DEVICE, ILLUMINATION DEVICE, PROJECTION APPARATUS AND OPTICAL DEVICE

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/103,508

(22) PCT Filed: Dec. 10, 2014

(86) PCT No.: PCT/JP2014/082750
§ 371 (c)(1),
(2) Date: Jun. 10, 2016

(87) PCT Pub. No.: WO2015/087934
PCT Pub. Date: Jun. 18, 2015

(65) Prior Publication Data
US 2016/0313567 A1 Oct. 27, 2016

(30) Foreign Application Priority Data

Dec. 13, 2013 (JP) .................................. 2013-258483

(51) Int. Cl.
*G02B 27/09* (2006.01)
*G02B 5/02* (2006.01)
(Continued)

(52) U.S. Cl.
CPC ........... *G02B 27/48* (2013.01); *G02B 5/0257* (2013.01); *G02B 26/10* (2013.01); *G02B 26/105* (2013.01);
(Continued)

(58) Field of Classification Search
CPC ............ G02B 27/0983; G02B 27/0966; G02B 27/48; G02B 5/0257; H04N 9/3161;
(Continued)

(56) References Cited

U.S. PATENT DOCUMENTS

| 6,913,358 B2 * | 7/2005 | Manuel Martins Borges De Almeida ................ A61B 3/107 351/212 |
| 7,585,078 B2 * | 9/2009 | Kim ..................... G02B 5/1828 348/771 |

(Continued)

FOREIGN PATENT DOCUMENTS

| CN | 103123419 A | 5/2013 |
| EP | 2 482 111 A1 | 8/2012 |

(Continued)

OTHER PUBLICATIONS

English translation of International Preliminary Report on Patentability (Application No. PCT/JP2014/082750) dated Jun. 14, 2016.
(Continued)

*Primary Examiner* — Ryan Howard
(74) *Attorney, Agent, or Firm* — Burr & Brown, PLLC

(57) ABSTRACT

An illumination device includes a diffusion member having an anisotropic diffusion surface, a rotary shaft member configured to rotate the anisotropic diffusion surface while a coherent light beam from a light source is illuminated on the anisotropic diffusion surface, and an optical device that further diffuses a coherent light beam diffused on the anisotropic diffusion surface, wherein the coherent light beam diffused on the anisotropic diffusion surface is diffused in a form of line and the diffused coherent light beam in the form of line is configured to move to draw a locus of rotation in one direction in accordance with the rotation of the anisotropic diffusion surface.

10 Claims, 9 Drawing Sheets

(51) Int. Cl.
| | |
|---|---|
| *H04N 9/31* | (2006.01) |
| *G03B 21/20* | (2006.01) |
| *G02B 27/48* | (2006.01) |
| *G02B 26/10* | (2006.01) |
| *G02B 27/30* | (2006.01) |

(52) U.S. Cl.
CPC ..... *G02B 27/0905* (2013.01); *G02B 27/0933* (2013.01); *G02B 27/0961* (2013.01); *G02B 27/0983* (2013.01); *G02B 27/30* (2013.01); *G03B 21/208* (2013.01); *G03B 21/2033* (2013.01); *H04N 9/3129* (2013.01); *H04N 9/3161* (2013.01); *H04N 9/3152* (2013.01)

(58) Field of Classification Search
CPC .. H04N 9/3129; H04N 9/3152; G03B 21/208; G03B 21/2033
See application file for complete search history.

(56) References Cited

U.S. PATENT DOCUMENTS

| | | |
|---|---|---|
| 2005/0083560 A1 | 4/2005 | Cvetkovich |
| 2009/0244669 A1 | 10/2009 | Uchikawa |
| 2013/0329755 A1 | 12/2013 | Arntsen et al. |

FOREIGN PATENT DOCUMENTS

| | | |
|---|---|---|
| JP | 07-013094 A1 | 1/1995 |
| JP | 2003-080389 A1 | 3/2003 |
| JP | 2009-169012 A1 | 7/2009 |
| JP | 2010-169828 A1 | 8/2010 |
| JP | 2012-058481 A1 | 3/2012 |
| JP | 2012-123381 A1 | 6/2012 |
| JP | 2012-230360 A1 | 11/2012 |
| JP | 2012-237810 A1 | 12/2012 |
| JP | 2012-237811 A1 | 12/2012 |

OTHER PUBLICATIONS

International Search Report and Written Opinion (Application No. PCT/JP2014/082750) dated Jan. 20, 2015.
Extended European Search Report (Application No. 14869011.8) dated May 10, 2017.
Chinese Office Action (Application No. 201480023149.X) dated Mar. 17, 2017 (with English translation).
Japanese Office Action (and translation provided by foreign counsel) from corresponding Japanese Patent Application No. 2013-258483 bearing a dated of Oct. 13, 2017, 12 pages.

* cited by examiner

OPTICAL SCANNING DEVICE, ILLUMINATION DEVICE, PROJECTION APPARATUS AND OPTICAL DEVICE

FIELD OF THE INVENTION

The present disclosure relates to an optical scanning device, an illumination device, a projection apparatus and an optical device, which use a coherent light beam as a light source.

BACKGROUND OF THE INVENTION

Projection apparatuses that use a semiconductor laser as a light source have been spread under a background of high output performance and cost-down of semiconductor lasers, and improvement in performance of MEMS (Micro Electro Mechanical System) mirrors that are used to reflect a coherent light beam.

However, there is a problem in that coherent beams emitted from a coherent light source cause speckles to be generated on a projection screen. Speckles are a spotted pattern which is formed when a coherent light beam such as a laser beam is illuminated on a scattering plane. If speckles are generated on a screen, they are observed as spotted luminance unevenness, i.e. brightness unevenness, thus becoming a factor of giving a physiologically adverse effect on an observer. It is considered that the reason why speckles are generated in the case of using coherent light beams is that coherent light beams reflected from respective portions of a scattering and reflecting plane such as a screen have very high coherency so that the coherent light beams interfere with one another to generate speckles.

The inventor of the present invention invented in the past an illumination device that makes speckles inconspicuous in an illumination zone LZ when the illumination zone LZ is illuminated with coherent light beams, with an optical scanning device to scan an optical device with coherent light beams incident thereon, so that the optical device illuminates the illumination zone LZ with the coherent light beams overlapped one another thereon. The inventor also invented a projection apparatus that makes speckles generated on a screen inconspicuous when projecting an optically modulated image on the screen, using such a type of illumination device. (See Japanese Laid-Open Patent No. 2012-58481.)

SUMMARY OF THE INVENTION

Optical scanning devices have a MEMS mirror or the like that has a reflection surface. The reflection surface is rotated in the uniaxial or biaxial direction at a specific deflection angle to change a reflection direction of coherent light beams. The coherent light beams reflected on the reflection surface are directly or indirectly incident on an optical device. For reducing speckles, it is desirable to scan the optical device with the coherent light beams by fine scanning as much as possible. The reason is that, the finer the scanning, the higher the multiplexity of angles, or the density in terms of angles, at which the coherent light beams are incident on the illumination zone LZ, thereby achieving maximum speckle reduction effects, with continuously changing the incidence direction. However, in order to scan the optical device with the coherent light beams by fine scanning as much as possible, it is required to drive the reflection surface of the optical scanning device accurately at a high speed, which requires a large-scale optical scanning device with a high installation cost.

Optical scanning devices that stably operate for a long time are usually provided with a resonance mechanism under control by a control signal of almost sine waves. Sine waves have a positive and a negative peak for each period. At each peak, the reflection surface once stops for changing the rotational direction. This means that there are two occasions in each scanning period that the scanning speed of a coherent light beam becomes almost zero. The degree of speckle reduction is lowered in a period in which the scanning speed of the coherent light beam is lowered to become almost zero.

As explained above, when the reflection surface of the optical scanning device is rotated at a specific deflection angle, the degree of speckle reduction varies with time, and hence an average speckle reduction effect cannot be improved.

The present invention is achieved to solve the above problems and a purpose of the present invention is to provide an optical scanning device, an illumination device, a projection apparatus and an optical device, which improve a speckle reduction effect without a complex structure.

In order to solve the problems above, according to an embodiment of the present invention, there is provided an optical scanning device including:

a diffusion member having an anisotropic diffusion surface; and a rotary shaft member configured to rotate the anisotropic diffusion surface while a coherent light beam from a light source is illuminated on the anisotropic diffusion surface;

wherein the coherent light beam illuminated on the anisotropic diffusion surface is diffused in a form of line from the anisotropic diffusion surface and the coherent light beam diffused in the form of line is configured to move to draw a locus of a line beam rotating on a specific plane, in accordance with the rotation of the anisotropic diffusion surface.

According to an embodiment of the present invention, there is provided an illumination device including:

a diffusion member having an anisotropic diffusion surface;

a rotary shaft member that is configured to rotate the anisotropic diffusion surface while a coherent light beam from a light source is illuminated on the anisotropic diffusion surface; and an optical device that is configured to further diffuse a coherent light beam diffused on the anisotropic diffusion surface;

wherein the coherent light beam diffused on the anisotropic diffusion surface is diffused in a form of line and the diffused coherent light beam in the form of line is configured to move to draw a locus of rotation in one direction in accordance with the rotation of the anisotropic diffusion surface.

DETAILED DESCRIPTION OF THE INVENTION

Hereinafter, embodiments of the present invention will be explained in detail. In the accompanying drawings of the present specification, in order to simplify the drawings and make understanding easy, the scale, the ratio of height to width, etc., are appropriately modified or enlarged from actual ones.

Shapes and geometrical conditions, and also their degrees used in this specification are defined. For example, the terms such as "parallel", "orthogonal" and "the same", the values of length and angle, etc. are, not to limited to the strict sense of the terms, but interpreted to such an extent that a similar function can be expected.

Figure 1:
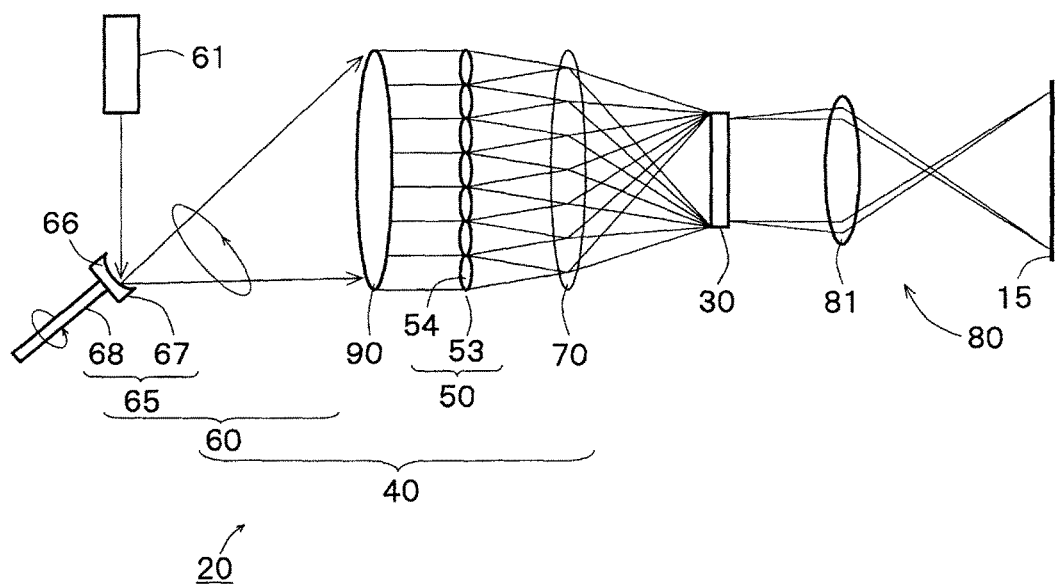
FIG. 1 is a block diagram schematically showing the configuration of a projection apparatus provided with an illumination device according to an embodiment of the present invention.

FIG. 1 is a block diagram schematically showing the configuration of a projection apparatus provided with an illumination device according to an embodiment of the present invention. The projection apparatus 20 of FIG. 1 is provided with an irradiation unit 60, a collimator lens 90, an optical device 50, a condenser lens (convergent optical system) 70, a spatial light modulator 30, and a projection optical system 80. The optical device 50 and the irradiation unit 60 make up of an illumination device 40.

The optical device 50 is configured by using, for example, a lens array 53. As described later, the optical device 50 may be a diffusion element other than the lens array 53, such as a hologram recording medium. When the hologram recording medium is used as the optical device 50, the collimator lens 90 may not be required. Moreover, when the lens array 53 is used as the optical device 50, the collimator lens 90 may also not be essential. However, in the following, the explanation will be made mainly with an example of using the collimator lens 90 and the lens array 53.

The irradiation unit 60 emits a coherent light beam to the lens array 53 so that the coherent light beam scans the surfaces of a plurality of lens elements 54 in the lens array 53. The irradiation unit 60 has a laser source 61 that emits a coherent light beam and a scanning device 65 that scans the surfaces of the lens elements 43 in the lens array 53 with the coherent light beam emitted from the laser source 61.

The laser source 61 in the irradiation unit 60 may include a plurality of laser sources 61 that emit laser beams of different wavelength ranges. When a plurality of laser sources 61 are used, it is arranged that the scanning device 65 is irradiated with a laser beam from each laser source 61. With this arrangement, the lens array 53 is illuminated with reproduction illumination light beams having illumination colors of the laser sources 61 mixed with one another.

The laser source 61 may include a single-color laser source 61 or a plurality of laser sources 61 of different emission colors. For example, the laser source 61 may include a plurality of laser sources 61 of red, green and blue. When a plurality of laser sources 61 are used, the laser sources 61 are arranged so that the scanning device 65 is irradiated with coherent light beams from the laser sources 61. With this arrangement, coherent light beams from the laser sources 61 are reflected by the scanning device 65 at reflection angles corresponding to the incidence angles of coherent light beams from the laser sources 61, incident on the lens array 53, collected and diffracted by the lens array 53 separately, and overlapped on one another on an illumination zone (specific zone) LZ, thereby having a combined color. When the laser source 61 includes a plurality of laser sources of, for example, red, green and blue, the combined color is white. Or a scanning device 65 may be provided for each of the laser sources 61.

For example, when illuminating with white, a color much closer to white may be reproduced by providing another laser source, for example, a laser source that emits light in yellow, other than red, green and blue. Therefore, there is no particular limitation on the type of the laser source 61 provided in the irradiation unit 60.

In the case where a laser beam emitted from the laser source 61 has a large beam diameter, a convergent lens (not shown) may be provided to condense the laser beam to a laser beam of a smaller beam diameter, which is then incident on the scanning device 65.

The scanning device 65 changes the reflection angle of an incident laser beam at a constant interval to scan the lens array 53 with a reflected laser beam. In more specifically, the scanning device 65 is provided with a diffusion member 67 having a cylindrical surface 66 for anisotropic diffusion and a rotary shaft member 68 for rotating the cylindrical surface 66 without an eccentric movement. The rotary shaft member 68 extends in a direction orthogonal to the bottom surface of the diffusion member 67. Here, the expression "rotates the cylindrical surface 66 without an eccentric movement" means that, during laser beam scanning, the rotary shaft member 68 rotates the cylindrical surface 66 always in the same direction at a constant rotational speed.

The cylindrical surface 66 is an anisotropic diffusion surface having a curvature that continuously varies in a first axial direction and a curvature that is constant in a second axial direction that intersects with the first axial direction. A laser beam from the laser light source 61 has a certain beam diameter and is incident on a place on the cylindrical surface 66 where the curvature continuously varies. The place on which the laser beam is incident is any place as long as the curvature on the place is continuously varying. The laser beam incident on this place is instantaneously diffused in a form of line. By rotating the rotary shaft member 68, the laser beam diffused in the form of line moves to draw a rotational locus. Being diffused in the form of line indicates the diffusion of a light beam having a line width, which is a concept including rectangular diffusion, diffusion with some irregularity, etc. The curvature indicates how a curved surface is bent.

The laser beam diffused in the form of line at the cylindrical surface 66 is directly or indirectly incident on the collimator lens 90. Being indirectly means that the laser beam is incident on the collimator lens 90 after being reflected by a reflection mirror or the like.

The collimator lens 90 converts the laser beam diffused in the form of line at the cylindrical surface 66 into a parallel beam. The collimator lens 90 is not an essential component. The collimator lens 90 can be omitted when an optical element disposed on a rear side of the collimator lens 90 along the optical axis thereof does not require incidence of the parallel beam.

The laser beam converted into the parallel beam by the collimator lens 90, or the laser beam diffused in the form of line at the cylindrical surface 66 is incident on the optical device 50. The optical device 50 according to the present embodiment has, for example, a lens array 53 having a plurality of lens elements 54. Each of the lens elements 54 is a concave lens, for example. Or each of the lens elements 54 may be a convex lens. When the lens array 53 is formed with a plurality of concave or convex lenses, the concave or convex lenses are arranged on a surface that is orthogonal to the optical axis of each lens. The lens elements 54 may be arranged in a one-dimensional direction or a two-dimensional direction.

Each of the lens elements 54 diffuses an incident laser beam. The laser beam diffused by each lens element 54 is incident on the condenser lens 70. The condenser lens 70 collects laser beams diffused by the lens elements 54 to generate illumination light beams that are overlapped on one another to illuminate an illumination zone LZ. In this way, the entire illumination zone LZ is illuminated at uniform light intensity.

The spatial light modulator 30 is disposed in the illumination zone LZ or in a rear side of the illumination zone LZ along the optical axis thereof. The spatial light modulator 30 generates a modulated image when illuminated with the illumination light beams from the illumination zone LZ.

As the spatial light modulator 30, a reflection-type microdisplay can be used. In this case, a modulated image is generated by reflected light beams at the spatial light modulator 30. In the reflection-type microdisplay, a plane on the spatial light modulator 30 illuminated with light beams from the illumination device 40 and an emitting plane for light beams of an image, i.e. reflected light beams, of a modulated image generated by the spatial light modulator 30 become the same plane. As the spatial light modulator 30 utilizing such reflected light beams, it is possible to use a MEMS (Micro Electro Mechanical Systems) device such as a DMD (Digital Micromirror Device).

As the spatial light modulator 30, a transparent-type liquid crystal microdisplay such as LCOS (Liquid Crystal on Silicon) can also be used. In this case, the liquid crystal microdisplay is illuminated by the illumination device 40 in the plane direction to allow laser light beams pass therethrough selectively per pixel to generate a modulated image thereon. The generated modulated image, i.e. an image light is varied its size by the projection optical system 80 and projected onto a diffuser screen 15. Speckle patterns of the modulated image projected onto the diffuser screen 15 vary with time, thus speckles become invisible.

Moreover, it is preferable that the incidence plane of the spatial light modulator 30 has the same shape and size as the illumination zone LZ that is illuminated with laser light beams by the illumination device 40. The reason is that laser light beams from the illumination device 40 can be used for displaying an image on the diffuser screen 15 at high utilization efficiency.

The projection optical system 80 that projects a modulated image generated by the spatial light modulator 30 onto the diffuser screen 15 has a projection lens 81. A modulated image generated by the spatial light modulator 30 is refracted by the projection lens 81 and projected onto the diffuser screen 15 as a modulated image. By adjusting the diameter of the projection lens 81, the distance between the projection lens 81 and the spatial light modulator 30, the distance between the projection lens 81 and the diffuser screen 15, etc., the size of the modulated image projected onto the diffuser screen 15 can be adjusted. The diffuser screen 15 of FIG. 1 is a transmission type to diffuse a projected modulated image light. The diffuser screen 15 may be a reflection type.

The spatial light modulator 30 can generate a variety of modulated images. By generating modulated images at the spatial light modulator 30 and illuminating the illumination zone LZ with the modulated images, a variety of modulated images can be projected onto the diffuser screen.

When creating a color modulated image, a variety of realization techniques are considered. When the light modulator 30 is configured with LCOS or the like equipped with a color filter for each pixel, by illuminating the illumination zone LZ with white light, it is possible to create a color modulated image at the light modulator 30.

Or, for example, a light modulator 30 to generate a red modulated image, a light modulator 30 to generate a green modulated image, and a light modulator 30 to generate a blue modulated image may be closely arranged, with three illumination zones LZ to illuminate the three light modulators 30, respectively, being successively illuminated with diffused light from the lens array 53. In this way, it is possible to combine three-color modulated images generated by the three light modulators 30 to create a color modulated image. Instead of such time division driving, three-color modulated images generated by the three light modulators 30 simultaneously may be combined by using a prism or the like to create a color modulated image.

The projection optical system 80 described above is provided mainly for the purpose of projecting a modulated image of the light modulator 30 onto the diffuser screen 15. By providing the diffuser screen 15, speckles are overlapped on one another and averaged, and as a result, become inconspicuous.

Consideration is made with the illumination zone LZ as a reference. A laser beam is always incident on each zone of the illumination zone LZ. Since the cylindrical surface 66 in the scanning device 65 is always rotating, the laser beam always varies its incidence direction to the illumination zone LZ. As a result, a modulated image light beam generated from a light beam, which passes through or which is reflected by the spatial light modulator 30, is projected onto a specific position on the screen 15, while changing its optical path with time.

Accordingly, by using the illumination device 40 according to the present embodiment, the incidence direction of a laser beam changes with time at each position of the screen 15 and this change occurs at a speed that is not covered by the resolution of human eyes. As a result, scattering patterns of laser beams with no correlations are overlapped on one another to be observed by human eyes. Therefore, speckles generated corresponding to the respective scattering patterns are overlapped on one another and averaged to be observed by an observer. Accordingly, speckles become inconspicuous effectively to an observer who observes an image displayed on the screen 15.

Conventionally, speckles observed by humans are not only speckles at the screen side caused by the scattering of laser beams on the screen 15 but also speckles at the projection apparatus side that could occur due to the scattering of laser beams before projection onto the screen. The speckle pattern generated at the projection apparatus side is also recognizable to an observer by being projected onto the screen 15 via the spatial light modulator 30. However, according to the present embodiment, laser beams continuously scan the optical device 50 and the laser beams incident on respective locations on the optical device 50 illuminate the entire region of the illumination zone LZ on which the spatial light modulator 30 is provided. Namely, the optical device 50 creates new wavefronts different from the prior wavefronts that have formed speckle patterns, thereby illuminating the screen 15 in a complex manner and uniformly via the illumination zone LZ and further the spatial light modulator 30. By the creation of new wavefronts at the optical device 50, speckle patterns generated at the projection apparatus side become invisible.

Figure 2:
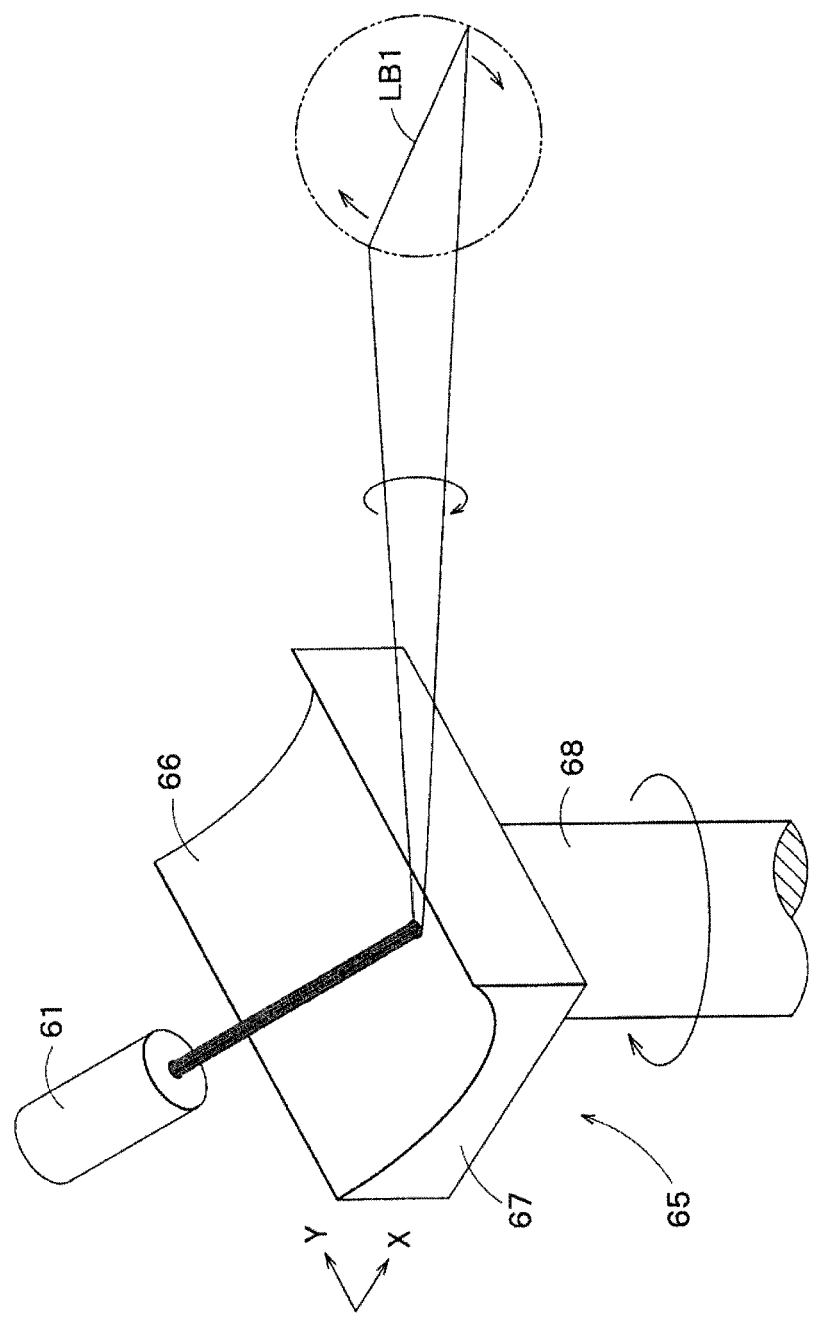
FIG. 2 is a diagram illustrating laser beam scanning by a scanning device 65 of FIG. 1.

FIG. 2 is a diagram illustrating laser beam scanning by the scanning device 65 of FIG. 1. The cylindrical surface 66 of the diffusion member 67 rotates at a constant speed about the rotary shaft of the rotary shaft member 68. Since the laser light source 61 is fixed on a certain location, laser beams from the laser light source 61 are incident always from the same direction. The cylindrical surface 66 has curvature that continuously varies in a first-axis X direction. When the cylindrical surface 66 is rotated, its curvature always varies at a beam spot position of a laser beam projected onto the cylindrical surface 66. A laser beam incident on a surface having any curvature is diffused in a form of line in a direction in accordance with the curvature. In the similar manner as the cylindrical surface 66, when a surface having continuously-varying curvature is rotated, a line laser beam LB1 diffused in the form of line moves to draw a locus of rotation about its center.

Figure 3:
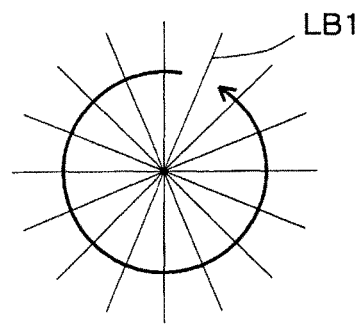
FIG. 3 is a plan view showing a locus of a line laser beam LB1 of FIG. 2.

FIG. 3 is a plan view showing loci of line laser beams LB1 on the collimator lens 90. As shown in FIG. 3, the line laser beams LB1 move to draw loci of rotation about the same center. In this way, the laser beams scan the incidence effective areas of the collimator lens 90 and the optical device 50, by fine scanning. The finer the laser beams scan the incidence effective areas of the collimator lens 90 and the optical device 50, the more gradually the incidence direction of the laser beams changes in incidence on the inconspicuous illumination zone LZ, and hence the more inconspicuous speckles on the illumination device side become.

As understood from FIGS. 2 and 3, the line laser beams LB1 move to draw loci of rotation in which the line laser beams LB1 always rotate in the same direction at the same speed. Therefore, when the scanning direction is changed in such a case where the scanning device 65 makes scanning in the uniaxial or biaxial direction, there is no possibility of the scanning speed being closer to zero, so that there is no time zone in which speckles are cyclically visible.

Figure 4:
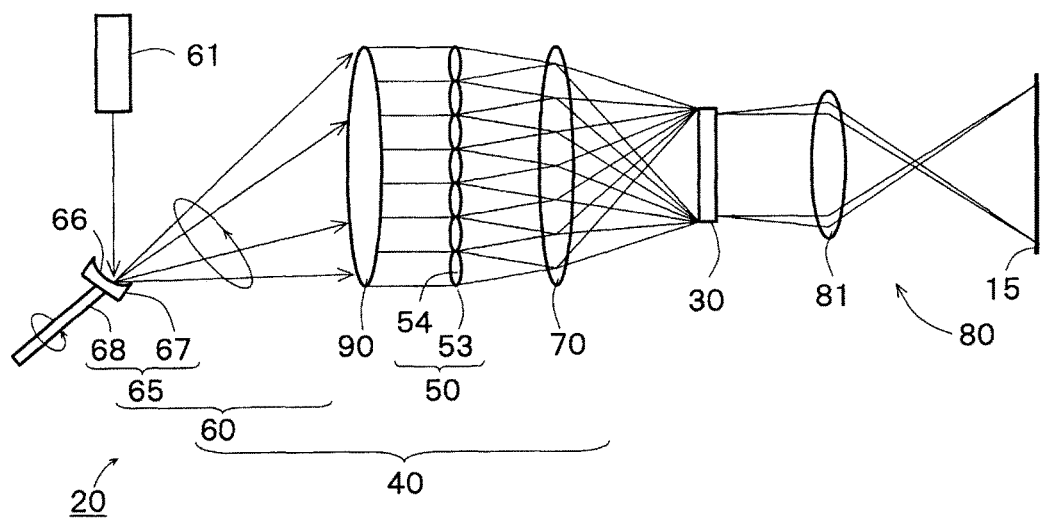
FIG. 4 is a block diagram showing an example of a scanning device 65 having a cylindrical surface 66 that rotates with an eccentric movement.

In the scanning device 65 of FIG. 1, the cylindrical surface 66 is rotated without an eccentric movement. However, the cylindrical surface 66 may be rotated with an eccentric movement. FIG. 4 is a block diagram showing an example of a scanning device 65 having a cylindrical surface 66 to be rotated with an eccentric movement.

The scanning device 65 of FIG. 4 has a rotary shaft member 68 that rotates a cylindrical surface 66 of a diffusion member 67, with an eccentric movement. The rotary shaft member 68 extends in a direction different from the direction of normal to the bottom surface of the diffusion member 67. Here, the expression "rotates the cylindrical surface 66 with an eccentric movement" means that, when the rotary shaft member 68 is rotated, not only the cylindrical surface 66 rotates in the rotation direction of the rotary shaft member 68, but also the cylindrical surface 66 vibrates vertically with respect to the plane direction.

Figure 5:
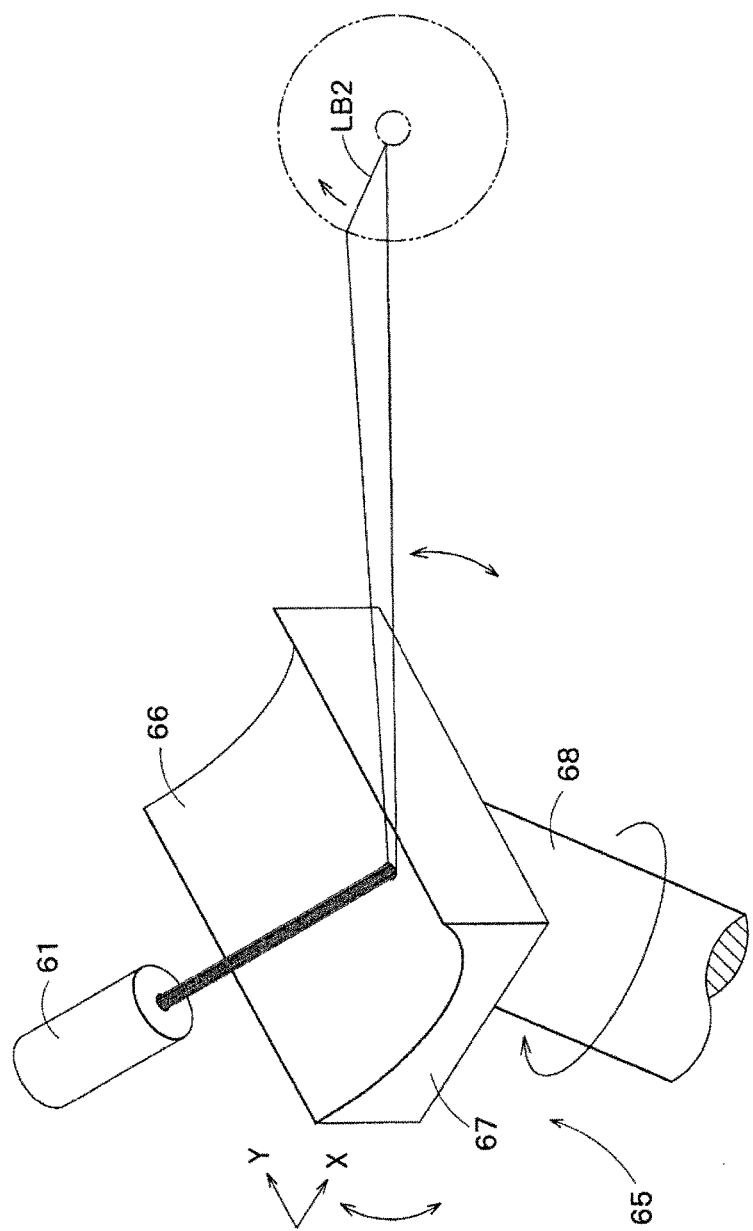
FIG. 5 is a diagram illustrating laser beam scanning by the canning device 65 of FIG. 4.

FIG. 5 is a diagram illustrating laser beam scanning by the scanning device 65 of FIG. 4. A laser beam illuminated on the cylindrical surface 66 becomes a line laser beam LB2 that is instantaneously diffused in a form of line. When the cylindrical surface 66 is rotated with an eccentric movement, as shown in FIG. 5, the line laser beam LB2 moves to draw a circular or an elliptical locus with a reference point at one end of the line laser beam LB2 as the center.

Figure 6:
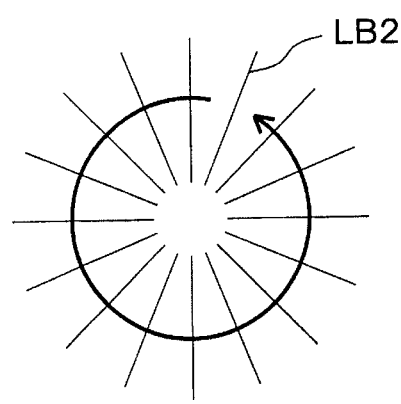
FIG. 6 is a plan view showing a locus of a line laser beam LB2 of FIG. 5.

FIG. 6 is a plan view showing loci of line laser beams LB2. As shown in FIG. 6, although the line laser beams LB2 move to draw a circular or an elliptical locus having a reference point O as the center, there is a circular area on the reference point side, which is not scanned with the line laser beams LB2.

As described above, when the cylindrical surface 66 is rotated with an eccentric movement, the line laser beams LB2 move to draw a locus of fine scanning to a circular or elliptical area except for a circular or an elliptical center area.

Figure 7:
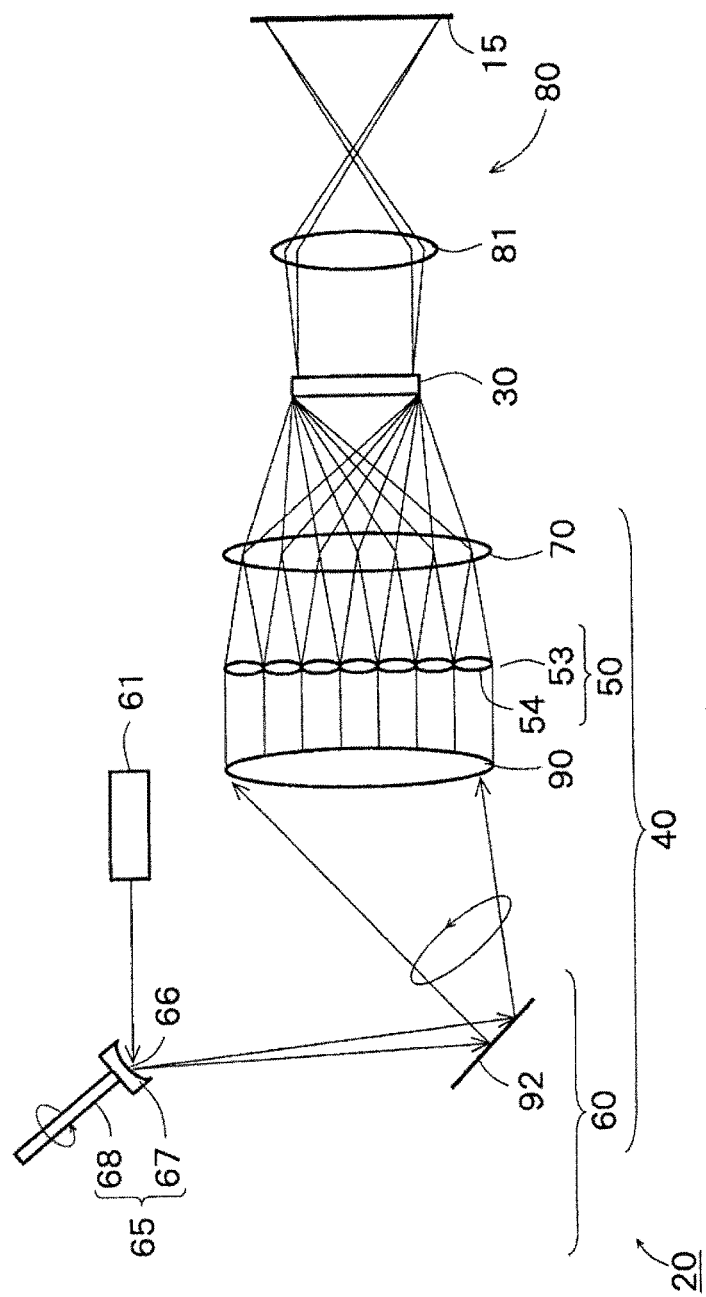
FIG. 7 is a block diagram showing an example of a projection apparatus having a reflection member.

In FIGS. 1 and 4, a laser beam reflected by the cylindrical surface 66 is directly incident on the collimator lens 90. However, as shown in FIG. 7, a laser beam reflected by the cylindrical surface 66 may be incident on the collimator lens 90 after it is reflected by a reflection member 92 such as a reflection mirror. By providing the reflection member 92, optical system design becomes easier and the scanning device 65 and the collimator lens 90 can be arranged closer to each other, so that a projection apparatus 20 may be downsized.

Figure 8:
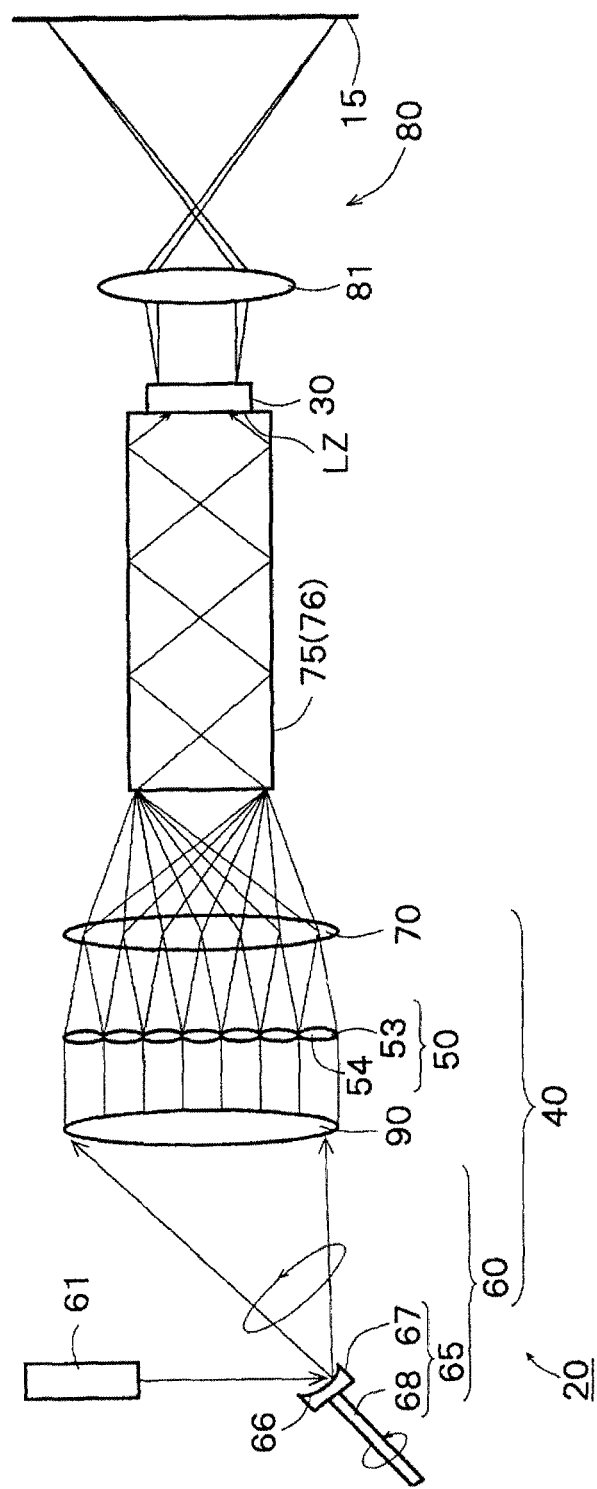
FIG. 8 is a block diagram schematically showing the configuration of a projection apparatus according to a modification of that of FIG. 1.

In order to provide a uniform luminance distribution in the illumination zone LZ as much as possible, it is preferable to provide a uniformizing optical system between the condenser lens 70 and the spatial light modulator 30. FIG. 8 is a block diagram schematically showing the configuration of a projection apparatus 20 according to a modification of FIG. 1. The projection apparatus 20 of FIG. 8 is provided with a uniformizing optical system 75 disposed between the condenser lens 70 and the spatial light modulator 30, in addition to the components of FIG. 1. The uniformizing optical system 75 may be incorporated into the projection apparatus 20 having the cylindrical surface 66 that rotates with an eccentric movement, such as shown in FIG. 4. The reflection member 92 such as shown in FIG. 7 may also be incorporated.

The uniformizing optical system 75 can be configured with an integrator rod 76, for example. The integrator rod 76 is formed into a cylindrical shape. The integrator rod 76 allows a laser beam incident on its incidence surface to propagate therethrough in an emission surface direction while allowing the laser beam to totally reflect inside the rod. In this way, what is emitted from the emission surface of the uniformizing optical system 75 is a laser beam of uniform light intensity in the entire emission surface. Although the degree of uniformization depends on the purpose of use, it is roughly 10% in variation of luminance distribution on the emission surface.

A positional adjustment to the integrator rod 76 is made between the condenser lens 70 and the spatial light modulator 30 so that most laser beams diffused by the lens array 53 are totally reflected inside the rod.

Figure 9:
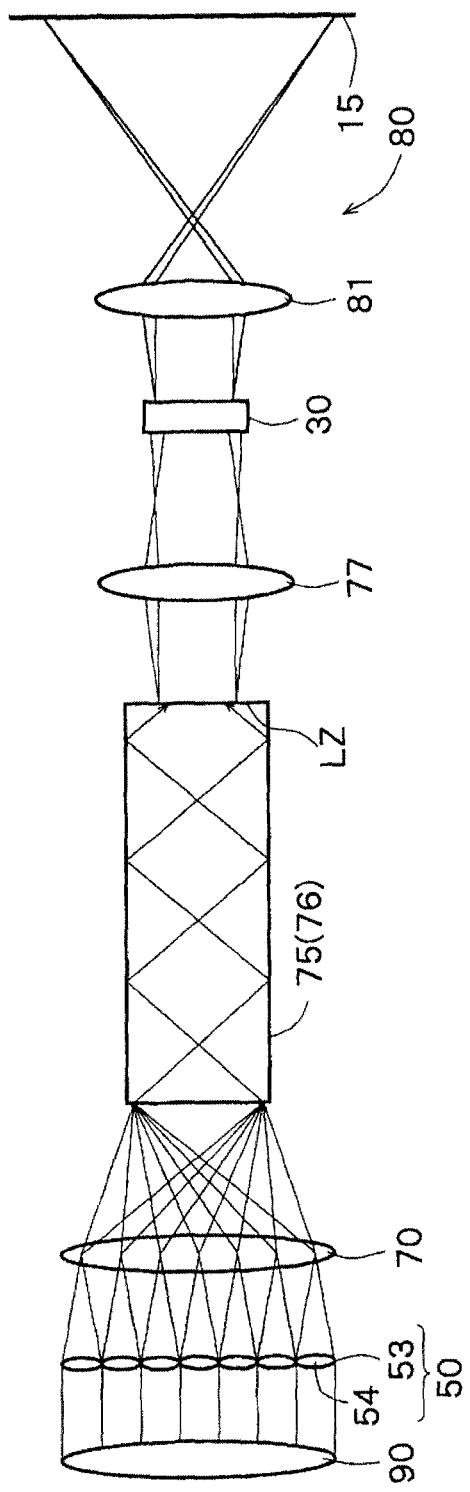
FIG. 9 is a block diagram schematically showing the configuration of a projection apparatus having a relay optical system added to that of FIG. 8.

The luminance distribution on the emission surface of the integrator rod 76 is uniform on the entire emission surface. Therefore, the emission surface can be set as the illumination zone LZ, with the spatial light modulator 30 being disposed near the emission surface of the integrator rod 76. Or, as shown in FIG. 9, a relay optical system 77 may be provided between the emission surface of the integrator rod 76 and the projection optical system, with the spatial light modulator 30 disposed behind the relay optical system 77 with respect to the emission surface. In this case, a positional adjustment is made so that the position of the emission surface of the integrator rod 76 and the position of the spatial light modulator 30 have a conjugate relation.

The convergent optical system 70 collects laser beams diffused by the optical device 50. The uniformizing optical system 75 allows the laser beams collected by the convergent optical system 70 to propagate therethrough while allowing the laser beams to totally reflect and then to be emit from the emission surface thereof. The emission surface of the uniformizing optical system 75 is illuminated at uniform light intensity, so that the emission surface can be used for plane illumination. In FIG. 1, the emission surface of the uniformizing optical system 75 is used as the illumination zone LZ. By providing the uniformizing optical system 75, the entire illumination zone LZ is illuminated at uniform light intensity.

FIG. 1 is explained with the lens array 53 as an example of the optical device 50. To the lens array 53, a Fresnel lens of total-refection-type or refraction-type, having a diffusion function, a fly-eye lens, etc. are applicable.

Figure 10:
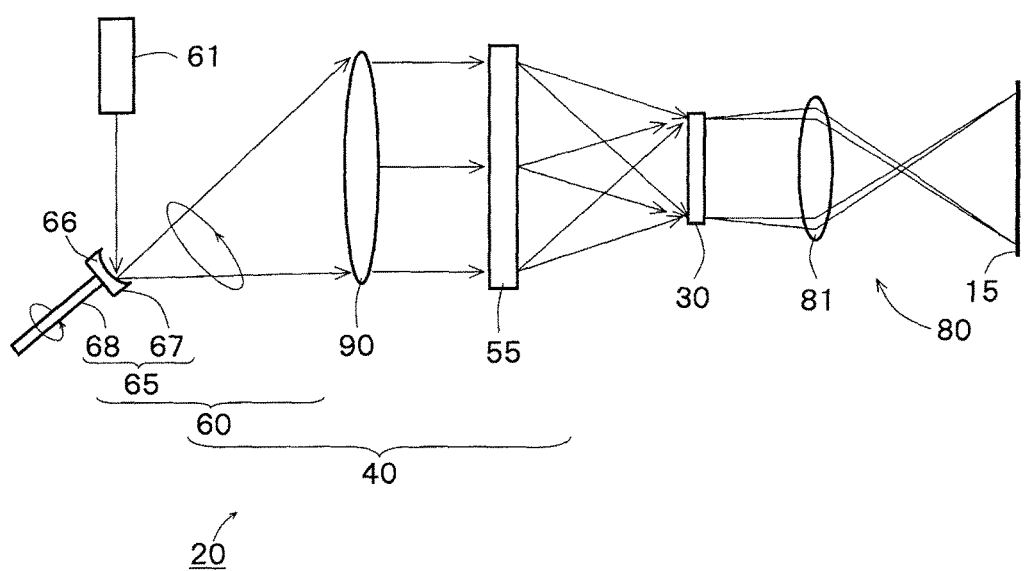
FIG. 10 is a block diagram showing an example of a projection apparatus 20 having a hologram recording medium 55 as an optical device 50.

Moreover, the optical device 50 may not be limited to the lens array 53. For example, a hologram recording medium can be used. FIG. 10 is a block diagram showing an example of a projection apparatus 20 having a hologram recording medium 55 as the optical device 50. The hologram recording medium 55 of FIG. 10 is formed with an interference fringe with which an image of a scattering plate can be reproduced in the illumination zone LZ. When a laser beam from the irradiation unit 60 is incident on the hologram recording medium, a laser beam diffracted by the interference fringe is emitted as diverging light, i.e. diffused light. In more detail, laser beams incident on respective positions of the hologram recording medium from the irradiation unit 60 are diffracted by the hologram recording medium and then incident on the integrator rod 76, after passing through the convergent optical system 70.

The hologram recording medium may, for example, be a reflection-type volume hologram using photopolymer. Moreover, the optical device 50 may include a transmission-type volume hologram recording medium or a relief-type, i.e. emboss-type hologram recording medium.

The optical device 50 may be configured with a scattering plate. The scattering plate may be glass material such as opal glass or obscure glass, or a resin scattering plate. Since the scattering plate diffuses laser beams reflected by the scanning device 65, like when the hologram recording medium or the lens array 53 is used, it is possible to illuminate the illumination region LZ from various directions. The term "diffusion" in the optical device 50 according to the present invention means that incident light beams are widened in angle and emitted. What is included in this context is, not only the case where the diffusion angle is controlled enough by the diffraction optical device 50, the lens array 53, etc., but also the case where an emission angle is widened by scattering particles such as opal glass.

As describe above, in the present embodiment, a laser beam is reflected by the anisotropic diffusion surface such as the cylindrical surface 66 to form a line laser beam LB1 which is then rotated by rotating the anisotropic diffusion surface in one direction. In this way, it is achieved to rotate a line laser beam incident on an optical device, in one direction, to scan the optical device with the line laser beam by fine scanning. Therefore, the incidence direction of a laser beam incident on the illumination zone LZ changes little by little so that speckles on the projection apparatus side become more inconspicuous.

Moreover, in the present embodiment, the scanning device 65 can be formed in a simple structure because what is required for the scanning device 65 is only to rotate the diffusion member 67 having the cylindrical surface 66 by means of the rotary shaft member 68. Furthermore, the scanning device 65 does not require an expensive member such as a MEMS mirror, and hence can be made at a low cost.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

The invention claimed is:

1. An optical scanning device comprising:
a diffusion member having an anisotropic diffusion surface; and
a rotary shaft member configured to rotate the anisotropic diffusion surface while a coherent light beam from a light source is illuminated on the anisotropic diffusion surface;
wherein the coherent light beam illuminated on the anisotropic diffusion surface is linearly diffused from the anisotropic diffusion surface and the coherent light beam linearly diffused is configured to move so as to draw a locus of a line beam rotating on a specific plane, in accordance with the rotation of the anisotropic diffusion surface, and
wherein the rotary shaft member is configured to rotate the anisotropic diffusion surface with an eccentric movement.

2. The optical scanning device of claim 1, wherein the anisotropic diffusion surface has a curvature that continuously varies in a first axial direction and a curvature that is constant in a second axial direction that intersects with the first axial direction.

3. The optical scanning device of claim 2, wherein the anisotropic diffusion surface is a cylindrical surface.

4. The optical scanning device of claim 1, wherein the rotary shaft member is connected to the diffusion member.

5. An illumination device comprising:
a diffusion member having an anisotropic diffusion surface;
a rotary shaft member that is configured to rotate the anisotropic diffusion surface while a coherent light beam from a light source is illuminated on the anisotropic diffusion surface; and
an optical device that is configured to further diffuse a coherent light beam diffused on the anisotropic diffusion surface, the optical device including a lens array;
wherein the coherent light beam diffused on the anisotropic diffusion surface is linearly diffused and the diffused coherent light beam is configured to move to draw a locus of rotation in one direction in accordance with the rotation of the anisotropic diffusion surface.

6. The illumination device of claim 5 further comprising a collimator lens that is configured to convert the coherent light beam diffused on the anisotropic diffusion surface into a parallel beam,
wherein the parallel beam converted by the collimator lens is incident on the optical device.

7. The illumination device of claim 5 further comprising a convergent optical system that is configured to collect coherent light beams diffused by the optical device to illuminate a specific area with the collected coherent light beams overlapped on another on the specific area.

8. The illumination device of claim 7 further comprising a uniformizing optical system that is disposed in the specific area or behind an optical axis of the specific area and allows an incident coherent light beam to propagate through the uniformizing optical system while allowing the coherent light beam to totally reflect on an inner wall of the uniformizing optical system and then to be emitted from the uniformizing optical system.

9. A projection apparatus comprising:
   the illumination device of claim 5;
   a spatial light modulator that is disposed in the specific area or behind an optical axis of the specific area and is configured to generate a modulated image when the spatial light modulator is illuminated with a coherent light beam that passes through the specific area; and
   a projection optical system that is configured to project the modulated image onto a specific projection member.

10. The projection apparatus of claim 9, further comprising a laser source,
    wherein a coherent light from the laser source is configured to be incident at a position of anisotropic diffusion surface other than the rotation center of the rotary shaft member.

* * * * *